United States Patent [19]

Seward

[11] Patent Number: 5,513,831
[45] Date of Patent: May 7, 1996

[54] SAFETY CONTROL KNOB FOR HOT WATER VALVE

[76] Inventor: Alfred L. Seward, 233 Nicks St., Graham, N.C. 27253

[21] Appl. No.: 443,009

[22] Filed: May 17, 1995

[51] Int. Cl.⁶ ................................................. F16K 35/02
[52] U.S. Cl. .................. 251/96; 74/25; 74/548; 74/554; 192/95; 251/229
[58] Field of Search ................. 74/25, 111, 548, 74/552, 553, 554, 575; 192/67 R, 95, 70.11; 251/95, 96, 229; 403/1

[56] References Cited

U.S. PATENT DOCUMENTS

| | | | |
|---|---|---|---|
| 2,194,714 | 3/1940 | Mueller | 251/96 |
| 2,236,109 | 3/1941 | Mueller | 251/96 |
| 2,501,008 | 3/1950 | Schramm | 74/548 |
| 2,780,333 | 2/1957 | Reiser et al. | 74/548 X |
| 2,797,592 | 7/1957 | Marrapese | 74/548 |
| 2,829,538 | 4/1958 | Mueller | 251/96 |
| 2,899,841 | 8/1959 | Melloy | 74/548 |
| 3,193,243 | 7/1965 | Billington et al. | 251/96 |
| 3,210,040 | 10/1965 | Thurlow | 251/96 |
| 4,549,716 | 10/1985 | Warren | 251/96 |
| 5,037,066 | 8/1991 | Kerger et al. | 251/96 |

Primary Examiner—George L. Walton
Attorney, Agent, or Firm—Rhodes, Coats & Bennett

[57] ABSTRACT

The present invention entails a safety control knob for actuating a valve stem of a water valve such as typically found in a hot water line. The safety control knob includes a control knob rotatively journaled on a valve stem and movable thereon between an inoperative and an operative position. In the inoperative position the control knob is effective to simply free-wheel around the valve stem without actually turning the valve stem. In an operative position, the control knob assumes a position engaged with a collar or other member that is keyed to the valve stem. In the engaged position, the control knob is operative to turn and actuate the valve stem.

3 Claims, 2 Drawing Sheets

SAFETY CONTROL KNOB FOR HOT WATER VALVE

FIELD OF THE INVENTION

The present invention relates to water valve controls and more particularly to a safety control device for preventing an unattended child from accidentally actuating a hot water valve.

BACKGROUND OF THE INVENTION

Children while in a bathtub are naturally drawn to the controls for the water faucet associated with the tub. They enjoy turning the faucet control or controls back and forth. There is, however, a danger here especially when the child is unattended. Children left unattended in a bathtub have often burned themselves by turning on the hot water. In some cases, the hot water is emitted directly from the faucet onto the child resulting in severe burns. In other cases, the continuous flow of hot water into the tub raises the temperature sufficiently high to injure or burn the child.

Therefore, there has been and continues to be a need for a safety control device that will prevent young children left unattended in a bathtub from actuating or turning on one or more control valves associated with the bathtub faucet. In particular, it is desirable to provide a control or safety device that will prevent the unattended child, while in the bathtub, from actuating and opening the hot water valve.

SUMMARY AND OBJECTS OF THE INVENTION

The present invention presents a safety control device for preventing children from accidentally scalding themselves or directing hot water into a bathtub. The safety control device includes a water valve control that is designed to free-wheel around a valve stem in response to the child engaging and turning the same. The same control device, which in the present disclosure is in the form of a rotary control knob, is operative to turn the valve stem back and forth by axially moving the control knob along the valve stem and engaging a cooperative collar or rotating member that is keyed to the valve stem. The control knob is spring biased to an inoperative free-wheeling position. However, the force of the spring associated with the control handle can be overcome and the control handle can be pushed into engagement with the keyed rotating member or collar such that the valve stem can be turned either clockwise or counter clockwise.

Consequently, in the inoperative free-wheeling state, a child may engage the control knob and turn the same about the valve stem without in fact actuating the valve stem or its associated control valve.

Thus, the present invention entails a control knob and a valve stem assembly for controlling a water valve such as a hot water valve. The control knob assembly is mounted on a rotary valve stem and includes a first member keyed to the valve stem shaft. A second member in the form of a control knob is rotatively journaled on the same valve stem and axially movable thereon between an inoperative free-wheeling position spaced from the first member and an engaged position where the control knob effectively engages the first member and is operative to turn the same which results in the valve stem being actuated and turned clockwise or counter clockwise. A spring is interposed between the control knob and the first member so as to bias the control knob towards the non-operative position. However, the force of the spring can be overcome by pushing the control knob towards the first member and engaging the first member such that the rotation of the control knob results in the first member also rotating and turning the valve stem.

DETAILED DESCRIPTION OF THE INVENTION

Figure 1:
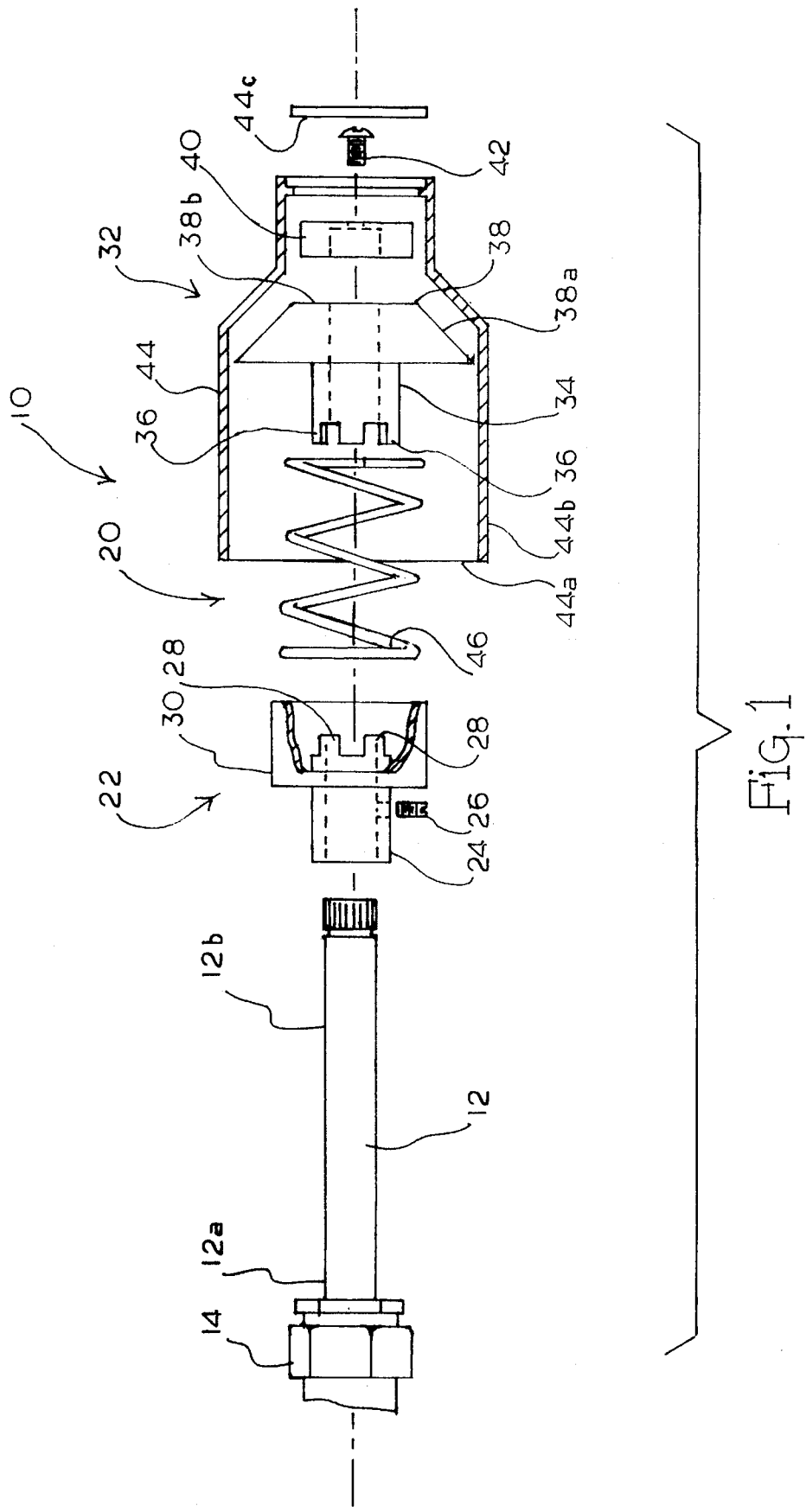
FIG. 1 is an exploded view of the water valve control device of the present invention.

With further reference to the drawings, the control device of the present invention for controlling a water valve is shown in the drawings and indicated generally by the numeral 10. Before proceeding with a detailed description of the present invention, it should be pointed out that the control device of the present invention is aimed at preventing a child from turning on a hot water valve or other type of valve. The control device of the present invention is designed such that the control knob for actuating the control valve normally assumes an inoperative mode or state and when turned simply free-wheels around a valve stem connected to the control valve. However, as will be explained in subsequent portions of this disclosure, the control knob can be selectively moved to an operative state where it does in fact rotate the valve stem in response to the knob being turned.

Continuing to refer to the drawings, there is shown therein an elongated valve stem 12 that is connected to a water valve (not shown) through a coupling 14. Valve stem 12 includes an inner end portion 12a and an outer end portion 12b. It is appreciated that the rotation of the valve stem 12 is operative to actuate or control a water valve. In the case of the present invention, it is contemplated that the control device 10 disclosed herein is particularly useful when employed on a valve stem 12 that is connected to a hot water valve.

Mounted on the valve stem 12 is a control knob assembly indicated generally by the numeral 20. The control knob assembly 20 includes an inner keyed member or collar 22 keyed to the valve stem 12 by a set screw 26. The keyed member or collar 22 is disposed on the inner end 12a of the valve stem. Collar 22 includes an inner sleeve 24 that includes a series of locking teeth 28 that extend and project towards the outer end 12b of the valve stem. Note that the teeth 28 are formed about the circumference of the outer end of the sleeve 24. Also the collar 22 includes an outer sleeve 30 that is open on one side and which basically surrounds and forms a cup around the plurality of locking teeth 28 that project from the inner sleeve 24. Thus, it is seen that the circular wall structure of the outer sleeve 30 essentially surrounds the circumferential teeth 28 that project from the sleeve 24.

Disposed on the outer end 12b of the valve stem 12 is a control knob indicated generally by the numeral 32. The control knob 32 is designed to assume a position on a valve stem 12 where it can be turned without actually turning the valve stem 12. With reference to the drawings, the control knob 32 includes an inner sleeve 34 that includes a through-bore that enables the sleeve to be inserted onto the valve stem 12 and to be journaled for rotation thereon. Inner sleeve 34 is provided with a locking structure that is designed to mate with the locking teeth 28 of the inner collar 22. In particular, an end portion of the inner sleeve 34 includes a series of circumferential spaced apart teeth 36 that are designed to mate with the teeth 28 of the inner collar 22. Secured or formed about the end of the inner sleeve 34 opposite the teeth 36 is a flared cup 38 that comprises a flared wall 38a and a back 38b. Note in FIGS. 2 and 3, that the control knob 32 is rotatively journaled on the outer end of the valve stem 12. The control knob 32 is axially movable back and forth on the valve stem 12. To limit the axial movement of the control knob 32, a stop 40 is secured to the outer end of the valve stem 12 by a screw 42. The diameter of the inner sleeve 34 is such that the entire control knob 32 and sleeve 34 can slide back and forth on the valve stem 12.

Figure 2:
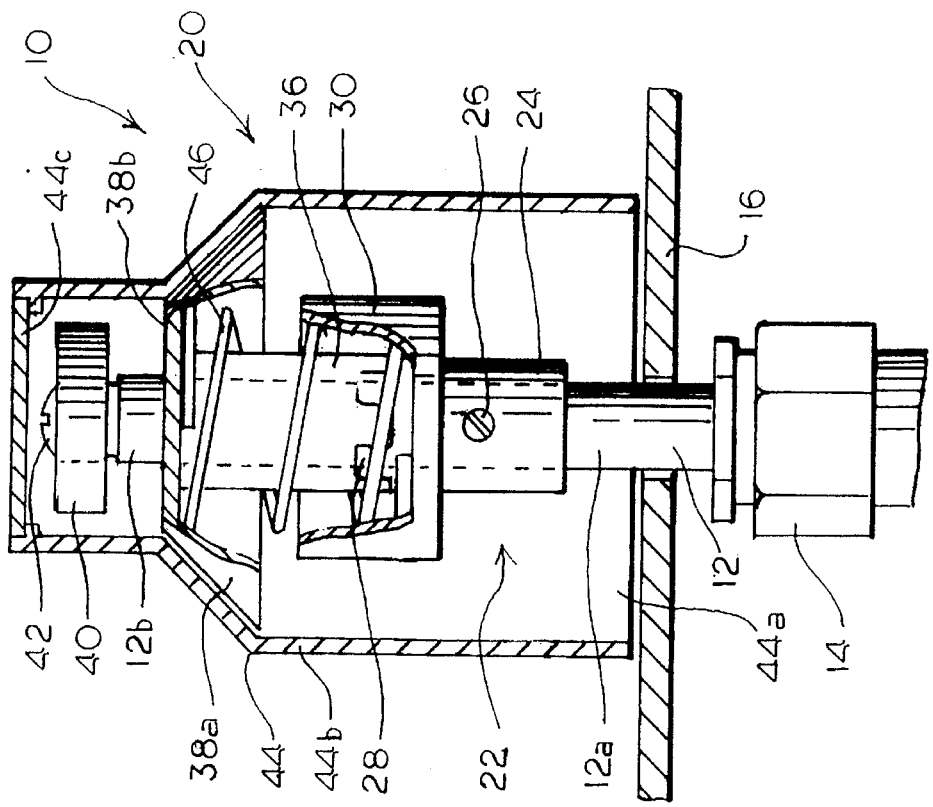
FIG. 2 is a side elevational view of the water valve control device of the present invention shown in the non-operative position and with the outer housing of the control device shown in section.
Figure 3:
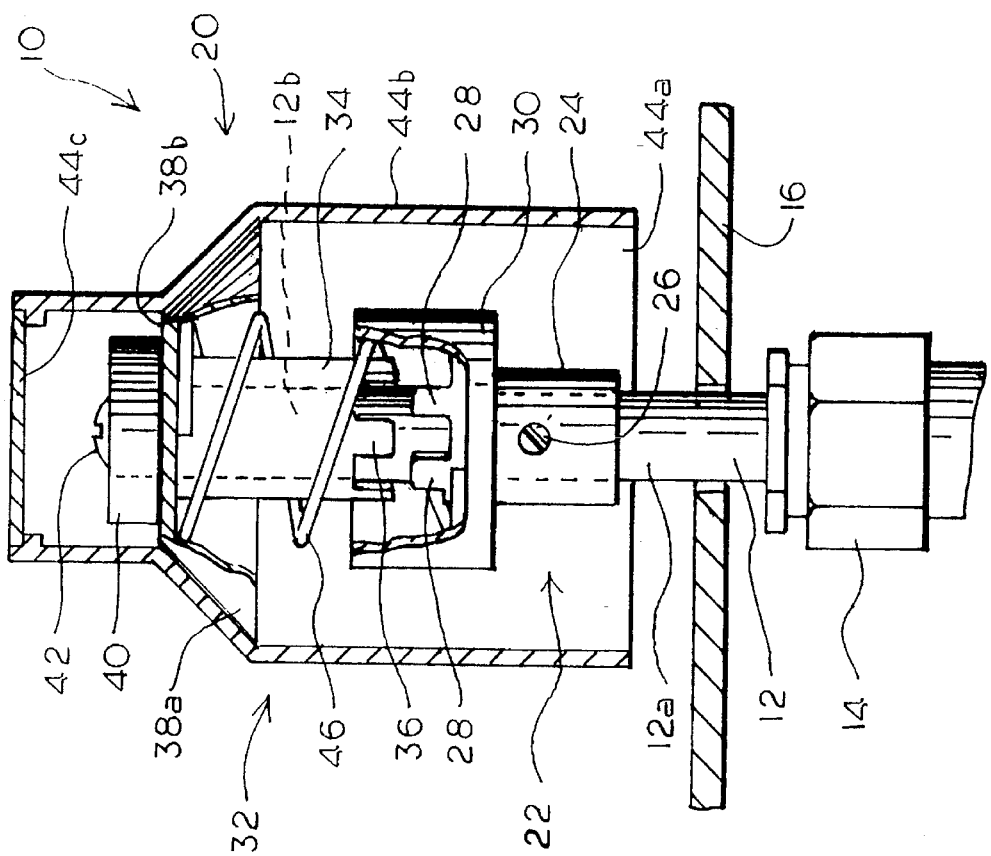
FIG. 3 is a view of the water valve control device of the present invention shown in the engaged position and with the housing structure thereof shown in section.

The control knob 32 is biased toward an inoperative position shown in FIG. 2. To bias the control knob 32 towards this position, there is provided a spring 46 interposed between the flared cup 38 and the inner collar 22. The outer sleeve 30 of the inner collar 22 includes a back and the spring 46 engages the back while extending between the outer sleeve 30 and the teeth 28. In the position shown in FIG. 2, it is appreciated that the teeth 28 and 36 are disposed in a non-engaged and spaced apart relationship. Thus, the control knob 32 and the inner sleeve 34 can be freely rotated about the valve stem 12 without actually turning the valve stem.

There is provided a knob housing 44 that is secured to the outer flared wall 38a of the cup 38 of the control knob 32. The knob housing 44 includes an open end 44a, a side wall 44b and a back 44c. It is seen that a portion of the interior of the side wall of the knob housing is designed to fit flush adjacent the flared wall 38a of the cup 38. It is at this point that the inner sleeve 34 is connected by a screw, glue or other securement means to the knob housing 44. As seen in the drawings, knob housing 44 project entirely around the control knob assembly 20 and particularly the inner collar 22 and control knob 32. Thus, these components are essentially housed within the knob housing 44.

To actuate the valve stem 12 and accordingly to open and close the associated water valve, the knob housing 44 is engaged with one's hand and pushed toward the partition wall 16 that supports the valve stem 12 and effectively divides the control knob assembly 20 from the coupling 14 secured to the valve stem 12. As the knob housing 44 is pushed towards the wall 16, the force of the spring 46 is overcome and the locking teeth 36 projecting forwardly from the inner sleeve 34 are pushed into mating slots that are formed between the respective teeth 28 that are formed on the end of sleeve 24 that forms a part of the inner keyed collar 22. Thus, once the teeth 36 are engaged with the teeth 28, there is formed a coupled relationship between the inner keyed collar 22 and the control knob 32. Thus, by turning the knob housing 44, torque associated with the knob housing 44 and the inner sleeve 34 is transferred to the inner keyed collar 22 which in turn results in the valve stem 12 being rotated clockwise or counter clockwise and accordingly, the associated water valve operated by the valve stem 12 is opened or closed. Once the valve stem 12 has been actuated, the knob housing 44 is released and the force of tile spring 46 pushes the control knob 32 from its operative engaged position, FIG. 3, to its inoperative free-wheeling position shown in FIG. 2.

It is thus appreciated that the control knob 32 when disposed in the position shown in FIG. 2, can be turned and free-wheeled about the valve stem 12 without actually turning the valve stem. Consequently, a child by simply turning the knob housing 44 when the same is disposed in the inoperative position in FIG. 2, cannot actuate a hot water valve associated with the valve stem 12 so as to cause hot water to be emitted from associated faucet.

From the foregoing specification and discussion, it is appreciated that the present invention presents a very efficient and effective control knob assembly for preventing an unattended child from actuating the hot water control valve and causing hot water to be directed onto the child or into a bathtub occupied by the child.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A free-wheeling safety control knob for a hot water valve that prevents unattended children from accidentally burning themselves with hot water, comprising:

a) single, continuous elongated valve stem adapted to be connected to a hot water control valve, the valve stem including an outer end portion and an inner end portion; and b) a control knob assembly mounted on the valve stem and including:
   1) an inner collar keyed to the valve stem and rotatable therewith, the inner collar being keyed to the valve stem at a point spaced from the outer end portion of the valve stem;
   2) the inner collar including a locking key face that faces the outer end of the valve stem;
   3) an outer collar journaled on the same valve stem between the outer end of the valve stem and the inner collar, the outer collar being freely rotatable and axially movable back and forth thereon, wherein the continuous, elongated valve stem extends all the way through both the inner and the outer collar to an exterior of the outer collar;
   4) the outer collar including a locking key face that faces towards the locking key face of the inner collar, and wherein the respective locking key faces are designed to mate when engaged such that the rotation of one collar will result in the rotation of the other;
   5) a spring interposed between the inner and outer collars which biases the outer collar towards a normal spaced apart non-engaged position where the outer collar is free to rotate about the valve stem without turning the valve stem and without effecting the inner collar,
   6) wherein the spring is disposed exteriorly of both, locking faces and extends around the respective locking faces within said inner and outer collars;
   7) an outer stop secured on the outer end of the valve stem for limiting the axial movement of the outer collar towards the outer end of the valve stem that extends to the exterior of the outer collar; and
   8) a knob secured on the outer collar for turning the same whereby the valve stem may be rotated by axially moving the outer collar into engagement with the inner collar and overcoming the force of the interposed spring such that the respective locking key faces of the collar engage and lock allowing the inner collar to rotate the valve stem in response to the knob being rotated.

2. The apparatus of claim 1 wherein the knob includes an outer housing and wherein the outer housing of the knob projects around both the inner and outer collars even when they assume the spaced apart non-engaged position.

3. The apparatus of claim 2 wherein the outer housing of the knob includes a back that covers the outer stop.

* * * * *